(12) United States Patent
Syvänne et al.

(10) Patent No.: US 8,085,752 B2
(45) Date of Patent: Dec. 27, 2011

(54) HANDLING CONNECTIONS MOVING BETWEEN FIREWALLS

(75) Inventors: Tuomo Syvänne, Vantaa (FI); Mika Jalava, Siuntio (FI)

(73) Assignee: Stonesoft Corporation, Helsinki (FI)

( * ) Notice: Subject to any disclaimer, the term of this patent is extended or adjusted under 35 U.S.C. 154(b) by 2572 days.

(21) Appl. No.: 10/300,918

(22) Filed: Nov. 21, 2002

(65) Prior Publication Data

US 2003/0117993 A1    Jun. 26, 2003

(30) Foreign Application Priority Data

Nov. 29, 2001    (FI) .................................. 20012339

(51) Int. Cl.
*H04J 3/24*    (2006.01)
(52) U.S. Cl. ..................... 370/349; 370/310; 370/345
(58) Field of Classification Search .................. 370/310, 370/345, 349
See application file for complete search history.

(56) References Cited

U.S. PATENT DOCUMENTS

| | | | |
|---|---|---|---|
| 5,490,139 A | 2/1996 | Baker et al. | |
| 6,049,533 A | 4/2000 | Norman et al. | |
| 6,226,523 B1 | 5/2001 | Karlsson et al. | |
| 6,347,338 B1 * | 2/2002 | Segal | 709/229 |
| 6,353,856 B1 * | 3/2002 | Kanemaki | 709/229 |
| 6,950,947 B1 * | 9/2005 | Purtell et al. | 726/12 |
| 7,093,287 B1 * | 8/2006 | Gusler et al. | 726/13 |
| 2002/0080752 A1 * | 6/2002 | Johansson et al. | 370/338 |
| 2002/0111172 A1 * | 8/2002 | DeWolf et al. | 455/456 |
| 2004/0044758 A1 * | 3/2004 | Palmer et al. | 709/223 |

FOREIGN PATENT DOCUMENTS

| | | |
|---|---|---|
| EP | 0 917 320 A2 | 5/1999 |
| EP | 1 156 691 | 11/2001 |
| WO | WO 00/52575 | 9/2000 |

* cited by examiner

*Primary Examiner* — Patrick Edouard
*Assistant Examiner* — Matthew Genack
(74) *Attorney, Agent, or Firm* — Barnes & Thornburg LLP

(57) ABSTRACT

A method of handling mobile entities in a firewall, wherein a first mobile entity table comprising identifiers of mobile entities, which are active in a firewall, and a second mobile entity table comprising identifiers of mobile entities, which are active in a predefined set of other firewalls and identifiers of corresponding other firewalls, are maintained in the firewall. A new mobile entity, which is not currently active in the firewall, is detected, after which it is found on the basis of the second mobile entity table, if the new mobile entity is currently active in another firewall. If the mobile entity is currently active in another firewall, state information related to the new mobile entity is queried from the another firewall, and stored in the firewall to be used for processing data packets from/to the new mobile entity.

17 Claims, 5 Drawing Sheets

| RULE # | SRC ADDR | DST ADDR | SERVICE | ACTION |
|---|---|---|---|---|
| 1 | any | 172.16.1.10 | http | allow |
| 2 | any | any | http | deny |
| 3 | 10.1.1.0 | 192.168.1.1 | ftp | allow |
| 4 | 10.1.1.0 | any | telnet | allow |
| 5 | any | any | any | deny |

HANDLING CONNECTIONS MOVING BETWEEN FIREWALLS

FIELD OF THE INVENTION

The present invention relates to network security and, more particularly, to firewalls or security gateways.

BACKGROUND OF THE INVENTION

Typically, various organizations protect their internal networks by means of a firewall, which connects the internal network of the organization to public networks and filters and selectively discards the data packets entering and exiting the internal network according to predefined rules. Thus, a firewall is a gateway which operates at the same time as a connector and a separator between the networks in a sense that the firewall keeps track of the traffic that passes through it from one network to another and restricts connections and packets that are defined as unwanted by the administrator of the system. Physically a firewall is a machine with appropriate software to do the tasks assigned to it. It can be a router, a personal computer (PC), or whatever that can be used for such purposes.

Frequently, the filtering rules of a firewall are expressed as a table or list (rule base) of rules comprising data packet characteristics and related actions. Data packet characteristics are parameter values that are obtained from header field of a data packet and may be e.g. source IP (Internet Protocol) address, destination IP address and service (or protocol) or some other values. The action gives information about how to handle a data packet, which corresponds the data packet characteristics defined in the respective rule (i.e. which matches the rule). This means that for a data packet, which has the header information indicated in a rule, the action indicated in the rule is carried out. In a firewall, the action is typically deny or allow, which means the data packet is discarded or allowed to proceed, correspondingly.

The rules of a rule base are examined in certain order until a decision how to process the data packet is reached. The order of the rules in the rule base typically defines the order in which characteristics of a data packet are compared to the rules, that is, the rules are examined one by one from the beginning of the rule base. When a rule, to which the characteristics of a data packet match, is found, the action that is related to that rule is taken and often there is no need to continue examining the rules. However, the action defined in the rule may be continue, in which case examining the rule base is continued from the next rule, or jump, in which case examining the rule base is continued from the rule specified in the jump action. The action of the firewall may be as well reject, which is similar to deny action. The difference is that deny action results in simply discarding the data packet and in reject the sender of the data packet is notified of discarding the data packet.

FIG. 1 illustrates as an example a rule base 10, having 5 rules. In each rule, a rule number, source IP address SRC ADDR, destination IP address DST ADDR, service (or protocol) and action are defined. However, this is only an example structure of rules, and also some other data packet characteristics may be defined in the rules. The rule #1 allows HTTP (Hyper-Text Transfer Protocol) data from any address to a server with IP address 172.16.1.10. All other HTTP traffic is denied with rule #2. That is, if HTTP traffic does not match the rule #1, it is denied. Rules #3 and #4 allow FTP (File Transfer Protocol) traffic from network 10.1.1.0 to FTP server at IP address 192.168.1.15 and Telnet connections from network 10.1.1.10 to any address, respectively. The firewall rule bases are commonly designed to prohibit all that is not expressly permitted in the rules. Therefore, the last rule in the rule base is usually designed to deny any data packet. Rule #5 in the rule base 10 is such rule, that is, it denies data packets of related to any service from any source address to any destination address. So, if a data packet does not match any of the first four rules, it matches this last one and is denied.

In summary, when a data packet is received in the firewall, some of the header field values of the data packet are compared to the rules, which are stored in the firewall, and when a matching rule is found, the action related to the matching rule is taken.

In a stateful firewall, information about connection history is maintained. In general, a data packet opening a connection is compared to the rules in the rule base, and if the data packet is allowed, a state is created for the opened connection. The state is created by making into a connection state table an entry including information for identifying the connection (e.g. source and destination address, ports and/or protocol) and the state of the connection. Other than data packets opening a connection are then compared to the connection state table and allowed, if a corresponding entry is found and the data packet is in accordance with the state of the connection. At the same time the state of the connection in the connection state table may be updated. If a corresponding entry is not found in the state table, the data packet may be compared to the rules in the rule base and possibly allowed on the basis of rules or simply discarded. Stateful inspection makes processing of data packets belonging to open connections faster than simple packet filtering on the basis of rules. Additionally, state of the connections (the data packets that have already been allowed and possibly their content) can be taken into account in processing data packets, which makes stateful firewall more secure than simple packet filter. Therefore stateful processing is desirable.

Traditionally, IP (Internet Protocol) address of an entity uniquely identifies the entity's point of attachment to the Internet. Therefore, the entity must be located on the network indicated by its IP address in order to communicate using the IP address. Otherwise, the data packets destined to the entity by using its IP address would not be deliverable. Mobile IP (Internet Protocol) is a protocol for enabling an entity to change its point of attachment to the Internet without changing the IP address it is using. That is, an entity can use the same IP address even if its location in the network changes. From the network point of view, this means that the path used to deliver the traffic for the entity can change.

According to mobile IP, each mobile node (or entity) is always identified by its home IP address, regardless of its current point of attachment to the Internet. When the mobile node (MN) is outside its home network and therefore not directly reachable by its home IP address, a care-of address, which provides information about its current point of attachment to the Internet, is assigned the mobile node in addition to the home IP address. The care-of address may be the IP address of a foreign agent (FA) located in the network the mobile node is visiting or it may be a co-located care-of address, which is an address of the network the mobile node is visiting, which is dynamically assigned to the mobile node (e.g. by means of DHCP, Dynamic Host Configuration Protocol). The mobile node registers the care-of address with a home agent (HA) in its home network by sending a Registration Request message (UDP, User Datagram Protocol, data packet to port 434) to which the home agent responds with a Registration Reply message in IPv4, which is the "current" version of Internet Protocol. In IPv6, which is the next generation of Internet Protocol, the registration is done by means of specific Extension Headers, wherein Binding Update and Binding Acknowledgement Destination Options (corresponding to Registration Request and Registration Reply respectively) are transmitted.

When the mobile node is in its home network, it communicates with other entities by using its home IP address normally. When the mobile node is outside its home network, that is, in a foreign network, other entities still reach the mobile node by using its home IP address. After the home agent has been notified that the mobile node is in a foreign network with a Registration Request message/Binding Update Destination Option giving the mobile nodes current care-of address, the home agent intercepts the data packets destined to the mobile node's home IP address. The home agent then encapsulates these data packets to data packets destined to the mobile node's care-of address (tunnels data packets) for delivery to the mobile node. If the care-of address is the address of the foreign agent, the foreign agent is the endpoint of the tunnel and it decapsulates the data packet and delivers the original data packet to the mobile node. Similarly, if the care-of address is a co-located care-of address, the mobile node is the endpoint of the tunnel and it decapsulates the data packet for obtaining the original data packet. The mobile node sends reply packets directly to the other end. In IPv6, the mobile node sends reply packets by using its care-of address as source address, and attaches its home address to a Home Address Extension Header. In this way the data packets are routed correctly (correct source address) and the other end is able to identify the mobile node by extracting the static home address form the Home Address Extension Header. After this the other end may communicate directly with the mobile node; this is done by using the care-of address of the mobile node as a destination address, but including also mobile node's home address in data packets in a Routing Extension Header.

The methods of mobile IP are deployed also in General Packet Radio Service (GPRS). GPRS Tunneling Protocol (GTP) is the protocol used between GPRS Support Nodes (GSNs) in the UMTS/GPRS backbone network. It includes both the GTP signaling (GTP-C) and data transfer (GTPU) procedures. In GPRS, special support nodes called Gateway GPRS Support Nodes (GGSN) and Gateway Serving GPRS Support Nodes (SGSN) are deployed. SGSNs provide the direct access point for GPRS phones, subtending from GGSNs that provide the gateway to SGSNs across mobile networks that the user may visit. The GGSN also is the access point for other packet data networks, such as Internet, and therefore enables communication between "normal" IP networks and GPRS devices. GTP is used to forward packets from GGSN to SGSN to reach a mobile device, dynamically setting up tunnels between GGSN and its home network and allowing the mobile unit to have its home network served beyond the GGSN Internet Gateway. GTP allows the GPRS user to be reachable from data networks, such as Internet, by using the same addressing information irrespective of its point of attachment to the network.

It is common that there is one firewall protecting the home network of a mobile node, and another firewall protecting a foreign network the mobile node is visiting. These networks may for example subnetworks belonging to the same organisation. Statefull filtering in a firewall uses information about previous packets of a connection for processing other data packets of the connection. In a situation, where statefull firewall starts seeing traffic in the middle of a connection it lacks the necessary information for processing the data packets and therefore discards the data packets and the respective connection fails. This happens when a mobile node moves from one network to another without changing the addressing information it is using. Therefore, information about the state of the connections needs to be shared between firewalls in order to enable connection roaming from one firewall to another.

In clustered firewalls (multiple parallel firewalls) and high availability solutions the state information is shared between firewalls (synchronization of state information) in order to enable one firewall to continue processing of a connection previously processed by another firewall. In these solutions, the state of each connection currently processed in each relevant firewall is usually synchronized to all other firewalls. This is feasible in a clustered firewall, since any of the cluster members need to be ready for taking over the connections processed by some other cluster member, and the number of the cluster members is in practice limited to a reasonable number. However, synchronizing all available state information between firewalls does not suit well for handling the location changes of mobile IP users. The distance between firewalls sets some limitations to the amount of information that is feasible to be shared. Additionally, synchronizing all state information would result in sharing unnecessary information as well, since many of the connections handled by the firewalls are from static sources and only some may involve a mobile user.

Due to these deficiencies, a more suitable method for enabling connection roaming between firewalls is needed.

SUMMARY OF THE INVENTION

An object of the invention is to fulfill the need described above by providing a method for handling mobile entities in firewalls and maintaining information in firewalls.

The objects of the invention are achieved according to the invention as disclosed in the attached independent claims. Preferred embodiments of the invention are disclosed in the dependent claims. The features described in one dependent claim may be further combined with features described in another dependent claim to produce further embodiments of the invention.

The idea of the invention is to synchronize high level information about active mobile entities between firewalls, and when a mobile entity moves from a first firewall to a second one, to fetch the accurate state information related to the mobile entity from the first one to the second one to be used in the second one for handling the connections of the mobile entity. Where to fetch the information is known on the basis of the synchronized high level information. Information about all active entities in a firewall do not need to be synchronized, but only information about active mobile entities, which may be reached by static addressing information irrespective of their point of attachment to the network. For such mobile entities, the open connections should not fail due to change of location. Information about which IP address may be used by mobile entities or which IP addresses may not be used by mobile entities may be configured in the firewalls in order to identify mobile entities. In practice, the firewalls among which the information is shared are firewall of one organization, e.g. firewall of one company or firewalls of an operator offering connectivity services to a plurality of customers. It is also possible that all connections, which are conveyed inside a tunnel (that is encapsulated into another data packet), are considered as connections, which are potentially used by mobile entities. Therefore, information about the endpoints of such tunnelled connections may be synchronized by the method according to the invention. Also detecting an IPv6 Extension Header (e.g. Home Address Header or Routing Header) can be used for identifying connections of potentially mobile entities.

According to the invention a first mobile entity table comprising identifiers of mobile entities, which are active in a firewall, and a second mobile entity table comprising identifiers of mobile entities, which are active in a predefined set of other firewalls and identifiers of corresponding firewalls, are maintained in the firewall. An identifier of a mobile entity may be for example an IP address or a subscriber number. Especially if the connections of the mobile entity are transferred within a tunnel, the identifier may be other than an IP address. When a new mobile entity not currently active in the firewall is detected, it is found on the basis of the second mobile entity table, if the new mobile entity is currently active in another firewall, and if the mobile entity is currently active in another firewall, state information related to the new mobile entity is queried from the another firewall, and the received state information is stored in the firewall to be used for processing data packets from/to the new mobile entity.

Detecting a new mobile entity may involve detecting a data packet in which the source is the new mobile entity or detecting registration of the new mobile entity. The registration may be detected due to negotiation for a new location or detecting routing protocol traffic. For example, the Session Initiation Protocol (SIP) may indicate that a mobile entity is moving from one firewall's influence to another's. A new entry corresponding to the new mobile entity is added in the first mobile entity table after detecting the new mobile entity.

The state information related to the mobile entity is history information of the open connections of the mobile entity, which is used in stateful connection processing in a firewall. The state information may include also authentication information or some other information used in processing data packets associated to the entity in question.

A firewall according to the invention sends the first mobile entity table to a predefined set of other firewalls as a response to a predefined action, such as an indication of a certain time period having elapsed since the first mobile entity table was sent the last time, a change in the content of the first mobile entity table, or receiving a request for the first mobile entity table.

The firewall receives from at least one other firewall a mobile entity table comprising identifiers of mobile entities which are active in the at least one other firewall. On the basis of the received mobile entity table the firewall updates (deletes, adds or modifies entries) its second mobile entity table and deletes an entry in its first mobile entity table, if a corresponding entry is contained in the received mobile entity table. Receiving an entry of the first mobile entity table in a mobile entity table of some other firewall indicates that the corresponding entity has moved from the firewall to the other firewall and may therefore be deleted from the first mobile entity table of the firewall as unnecessary. The state information associated with the mobile entity are in practice queried from the firewall by the other firewall before deleting the corresponding entry in the first mobile entity table of the firewall. Alternatively, entries of a first mobile entity table may be removed also on the basis of a timer.

The invention relates as well to a method of maintaining information in a firewall, comprising maintaining a first mobile entity table comprising identifiers of mobile entities which are active in the firewall, sending the first mobile entity table to a predefined set of other firewalls as a response to a predefined action, receiving from at least one other firewall a mobile entity table comprising identifiers of mobile entities which are active in the at least one other firewall, and maintaining a second mobile entity table comprising identifiers of mobile entities which are active in the at least one other firewall and an identifier of the corresponding firewall on the basis of the mobile entity table received from at least one other firewall.

A firewall according to invention may request from at least one other firewall a mobile entity table comprising identifiers of mobile entities which are active in the at least one other firewall for maintaining the first mobile entity table in the firewall.

Compared to traditional synchronization of state information used e.g. in clusters, the method according to the invention requires much less information transfer between the firewalls.

These and other features of the invention, as well as the advantages offered thereby, are described hereinafter with reference to embodiments illustrated in the accompanying drawings.

PREFERRED EMBODIMENTS OF THE INVENTION

The present invention can be applied in any stateful network gateway or firewall, which is processing data packets of mobile entities, which may be reached by static addressing information irrespective of their point of attachment to the network. For such mobile entities, the open connections should not fail due to change of location.

The data connectivity of the mobile entity may be through wireless or fixed line connection. Typically such mobile entities are portable computer devices, such as laptop computers, PDAs, communicators, smart phones, intelligent telecommunication devices, etc. The physical location independence of the mobile entities may be based on mobile IP, GTP or some other protocol. The system providing connectivity to the mobile entity may be but is not limited to LAN (Local Area Network), WLAN (Wireless LAN), GSM (Global System for Mobile communications), GPRS (General Packet Radio Service), or UMTS (Universal Mobile Telecommunications System).

The invention relates to synchronizing high level information about active mobile entities between firewalls, and when a mobile entity moves from a first firewall to a second one, to fetching the accurate state information related to the mobile entity from the first one to the second one to be used in the second one for handling the connections of the mobile entity. Where to fetch the information is known on the basis of the synchronized high level information.

Figures 1, 2A:
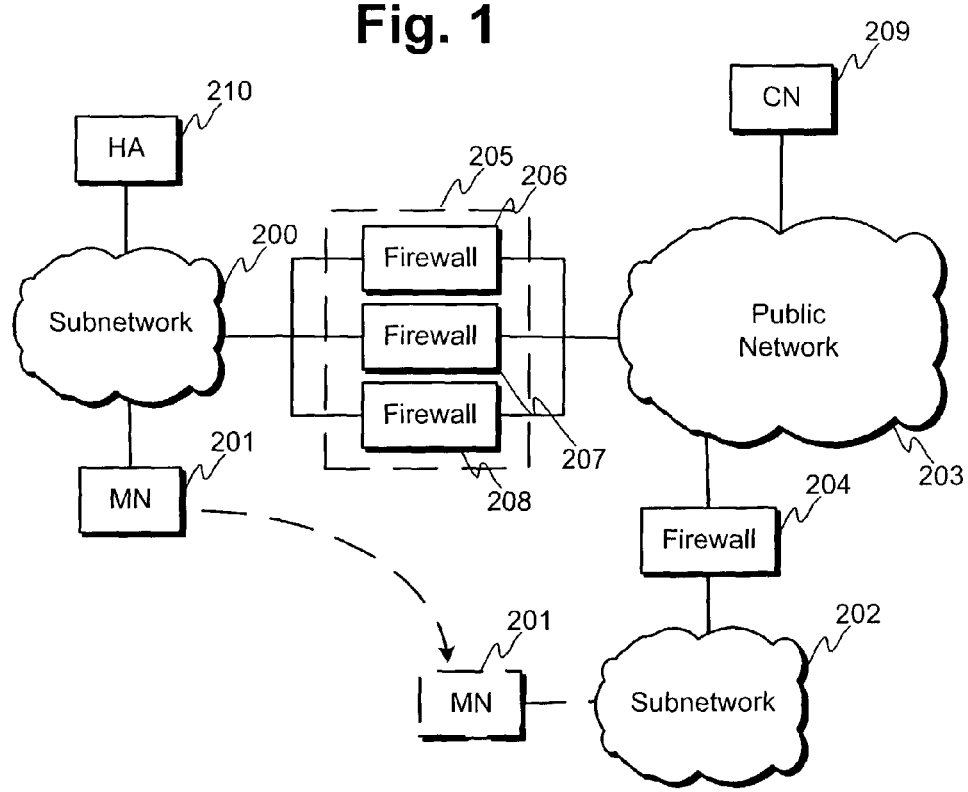
FIG. 1 illustrates an exemplary prior art rule base.
FIGS. 2A, 2B and 3 are schematic block diagrams of exemplary network configurations wherein the present invention can be applied.
Figure 2B:
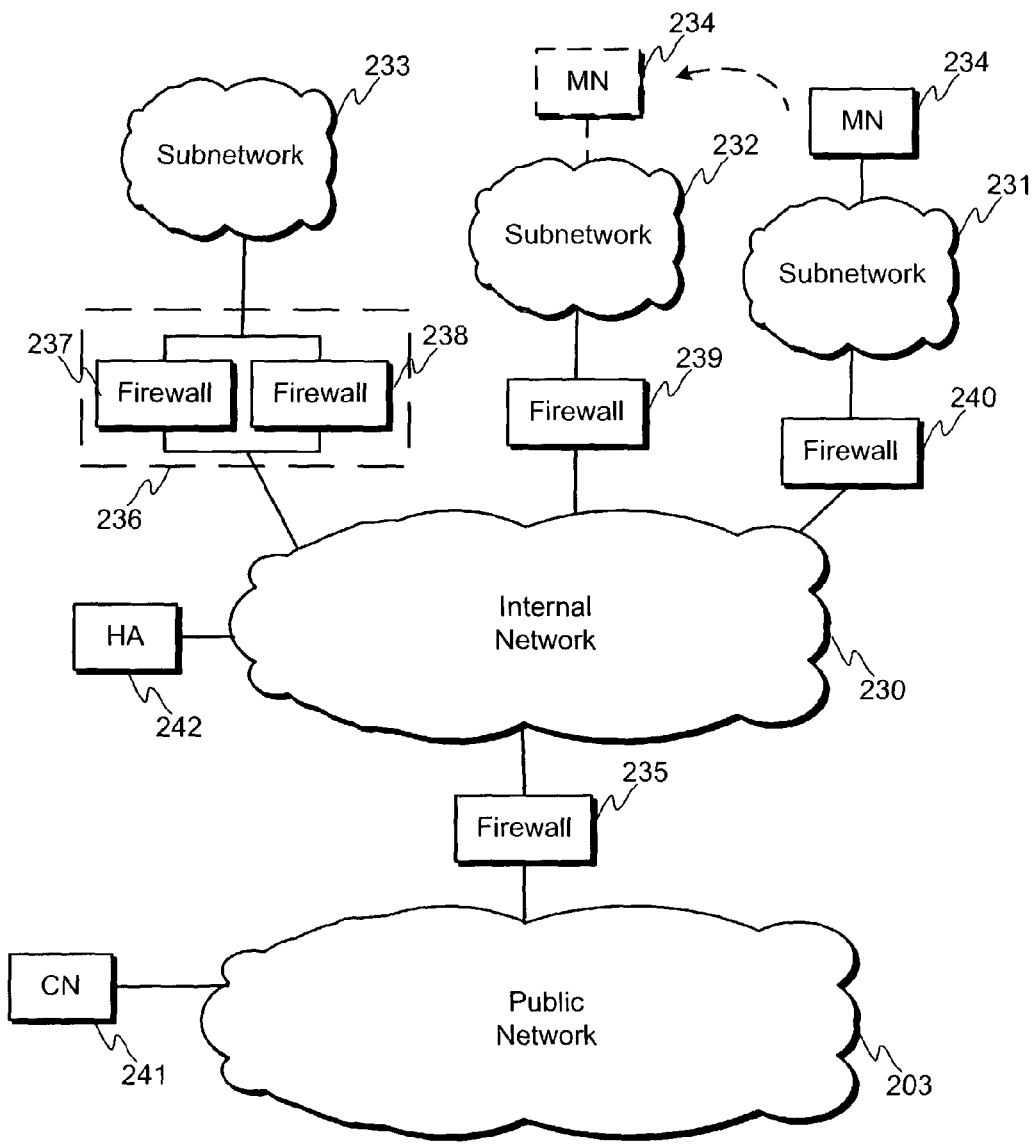
Figure 3:
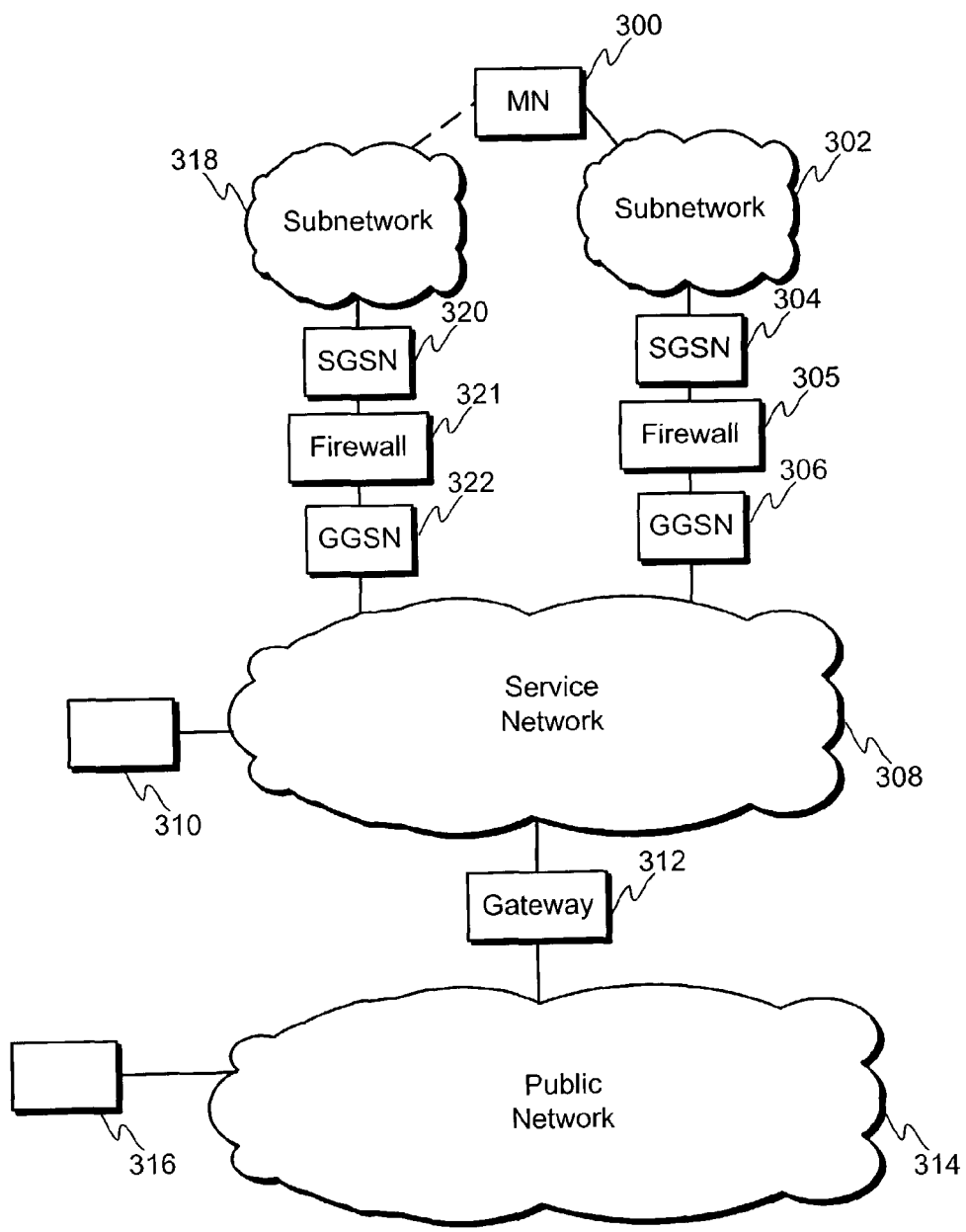

FIGS. 2A, 2B and 3 are schematic block diagrams of exemplary network configurations wherein the present invention can be applied. The configurations are shown only to facilitate the understanding and description of the present invention.

The present invention is not intended to be restricted to any particular network configuration. Further, in order to improve clarity, mainly only network elements which are somehow involved with the present invention are shown in FIGS. 2A, 2B and 3.

FIG. 2A shows a network configuration in connection with mobile IP. A subnetwork 200 is connected to a public network 203 via a firewall system 205. The firewall system contains three parallel firewalls 206, 207 and 208 in order to ensure connectivity through the firewall system. However, in the connection of this invention the structure of the firewall system is not relevant. Another subnetwork 202 is connected to the public network via a firewall 204. A mobile node 201 is connected to the subnetwork 200, which is its home network. A home agent 210 is as well connected to the subnetwork 200. The mobile node communicates with a correspondent node 209 attached to the public network 203. With help of the home agent 210, the mobile node may change its point of attachment to the subnetwork 202 (shown with dashed line in FIG. 2A) without breaking its connection with the correspondent node 209. In this case, the connection is first handled with the firewall system 205 and then with the firewall 204. Assuming that the firewalls are stateful firewalls and in order not to break the connection state information needs to be shared between the firewalls 204 and 205. Using the method according to the invention in the firewalls enables this. However, if the mobile node 201 has ongoing connections within the subnetwork 200 before the change of the location, those connections fail after the move, since the firewall system 205 does not have information about the connections inside the subnetwork 200.

FIG. 2B shows another network configuration in connection with mobile IP. Three subnetworks 231, 232 and 233 are connected to an internal network 230 via firewalls 236 (a cluster containing two parallel firewall devices 238 and 237), 239 and 240. The internal network 230 is connected to public network 203 via a firewall 235. A mobile node 234 is connected to the subnetwork 231 and may change its location to any of the subnetworks 232 and 233 (shown with dashed line in FIG. 2B), therefore the firewalls 236, 239 and 240 need to be able to handle moving open connections. The physical location of the mobile node 234 is known to a home agent 242 in the internal network. The mobile node may communicate for example with a correspondent node 241 connected to the public network 203.

FIG. 3 illustrates a schematic block diagram of exemplary network configuration related to GPRS system where the invention may be used. Therein two wireless subnetworks 302 and 318 are connected to a service network 308 via SGSNs 304, 320 and GGSNs 306, 322. SGSNs provide the direct access point for GPRS devices in the subnetworks 302, 318. GGSNs that provide the gateway to SGSNs across mobile networks that the user may visit. The GGSN also is the access point for other packet data networks, such as Internet, and therefore enabling communication between "normal" IP networks and GPRS devices. Data is transferred between SGSNs and GGSNs in tunnels according to GTP (GPRS Tunneling Protocol). Between the SGSN 304 and GGSN 306 there is a firewall 305 filtering the GTP tunnel. Accordingly, there is a firewall 321 between the SGSN 320 and the GGSN 322. The service network 308 is further connected to a public network 314 (such as Internet) via a gateway 312, which may or may not be a firewall device.

In subnetwork 302 there is connected a GPRS device 300, which may communicate with an entity 310 connected to the service network 308 or with an entity 316 connected to the public network 314. These connections go through the firewall 305. The GPRS device 300 may change its location to the subnetwork 318 (shown with dashed line in FIG. 3), which causes that the connections of the GPRS device move to the firewall 321.

Naturally, the coupling between the different networks in FIGS. 2A, 2B and 3 may include also routers and Internet service providers (not shown in Figures). As is well known in the art, the internal networks or subnetworks may be, for example, company networks, such as a local area networks (LAN) or a wireless LANs (WLAN) which connect users and resources, such as workstations, servers, printers and the like of the company. Alternatively, the internal networks or subnetworks may consist of connections of individual subscribers such as ADSL subscribers or subscribers of a wireless network such as GSM, GPRS or UMTS network. In this case, the term internal network may not be very descriptive, and instead a term such as a service network could be used.

The method of the invention may be used for example in any of the firewalls 204, 205, 236, 239, 240, 305, 321 discussed above. As already described above, the firewalls 204, 205, 236, 239, 240, 305, 321 are gateways which operate at the same time as connectors and separators between the networks in a sense that the firewalls keep track of the traffic that passes through them from one network to another and restrict connections and packets that are defined as unwanted by the administrators of the systems. Physically a firewall is a device with appropriate software to do the tasks assigned to it. It can be a router, a personal computer (PC), or whatever that can be used for such purposes.

Figure 4A:
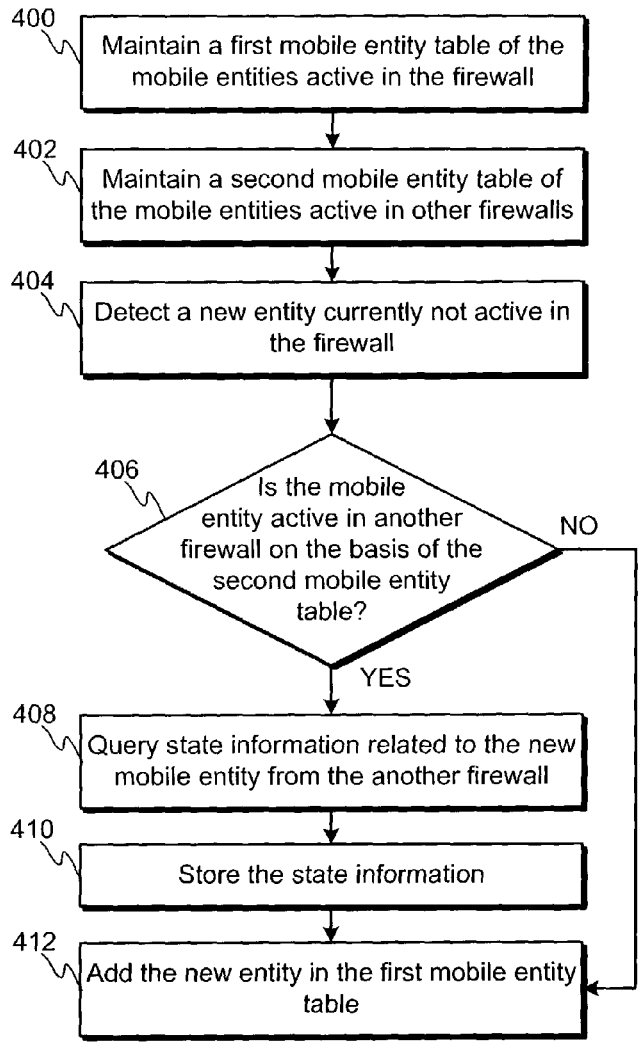
FIG. 4A is a flow diagram illustrating operation according to one aspect of the invention.

FIG. 4A is a flow diagram illustrating operation according to one aspect of the invention. In steps 400 and 402, a first mobile entity table comprising identifiers of mobile entities, which are active in a firewall, and a second mobile entity table comprising identifiers of mobile entities, which are active in a predefined set of other firewalls and identifiers of corresponding firewalls, are maintained in the firewall. An identifier of a mobile entity may be for example an IP address or a subscriber number. Especially if the connections of the mobile entity are transferred within a tunnel, the identifier may be other than an IP address. In step 404, a new mobile entity not currently active in the firewall is detected. Then, it is found on the basis of the second mobile entity table, if the new mobile entity is currently active in another firewall (step 406). If the mobile entity is currently active in another firewall, state information related to the new mobile entity is queried in step 408 from the another firewall, and the received state information is stored in the firewall to be used for processing data packets from/to the new mobile entity in step 410. In step 412, a new entry corresponding to the new mobile entity is added in the first mobile entity table. If it is found in step 406 that the mobile entity is currently not active in any other firewall, the process proceeds straight to step 412 for adding a new entry. In this case, it is assumed that the mobile entity is only starting communication and does not have any ongoing connections open.

The state information related to the mobile entity is history information of the open connections of the mobile entity, which is used in stateful connection processing in a firewall. The state information may include also authentication information or some other information used in processing data packets associated to the entity in question.

Figure 4B:
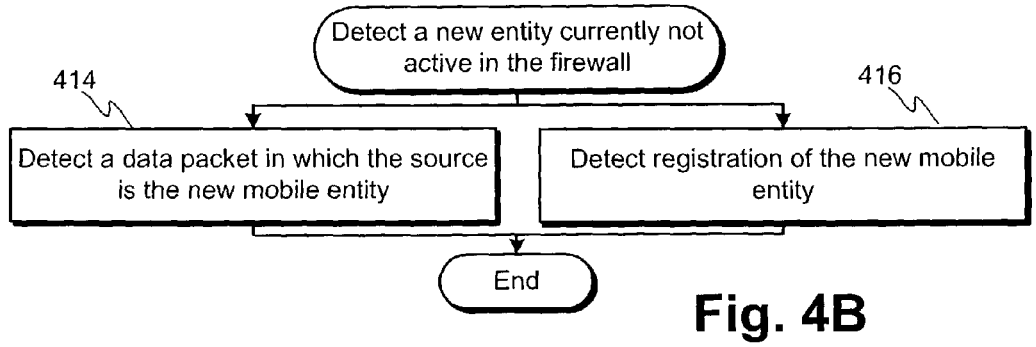
FIG. 4B is a flow diagram illustrating detection of a new mobile entity according to the invention.

FIG. 4B is a flow diagram illustrating detection of a new mobile entity according to the invention. Detecting a new mobile entity may involve detecting a data packet in which the source is the new mobile entity in step 414 or detecting registration of the new mobile entity in step 416. The registration may be detected due to negotiation for a new location or detecting routing protocol traffic. For example, the Session Initiation Protocol (SIP) may indicate that a mobile entity is moving from one firewall's influence to another's. SIP is an Internet Engineering Task Force (IETF) standard protocol for initiating an interactive user session that involves multimedia elements such as video, voice, chat, gaming, and virtual reality. Because the SIP supports name mapping and redirection services, it makes it possible for users to initiate and receive communications and services from any location, and for networks to identify the users where ever they are. In relation to Mobile IP, the change of location may be detected from Registration Request/Binding Update messages.

Figure 5:
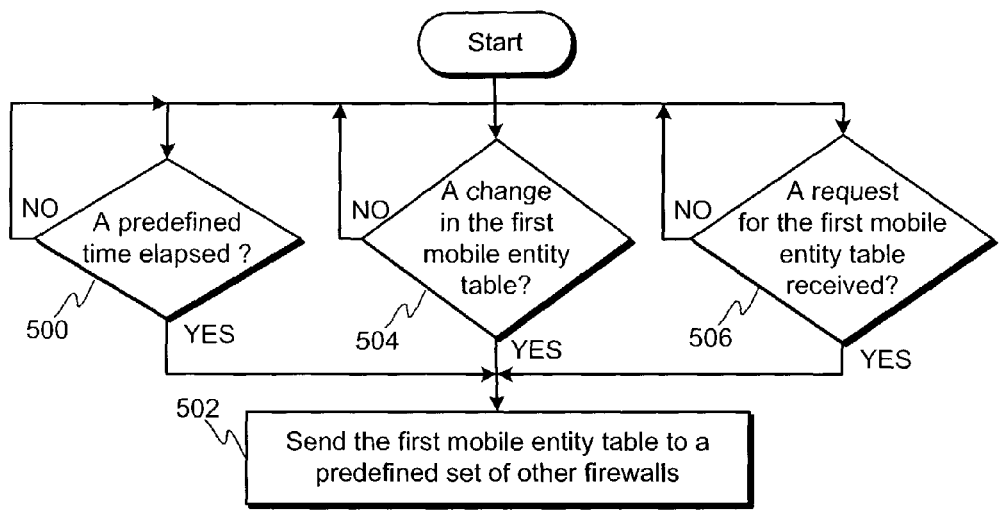
FIG. 5 is a flow diagram illustrating exemplary methods for triggering sending a mobile entity table to other firewalls.

A firewall according to the invention sends the first mobile entity table to a predefined set of other firewalls as a response to a predefined action. FIG. 5 is a flow diagram illustrating exemplary methods for triggering sending a mobile entity table to other firewalls. In step 500 it is checked, if a predefined time period has elapsed since the first mobile entity table was sent the last time. If it has, the first mobile entity table is sent in step 502 to a predefined set of other firewalls. In step 504 it is checked, if the content of the first mobile entity table has changed. If it has, the first mobile entity table is sent in step 502 to a predefined set of other firewalls. This may be done also so that when ever an entry is added, deleted or modified in the first mobile entity table, it is sent to the other firewalls. In step 506 it is checked, if a request for the first mobile entity table is received. If it is, the first mobile entity table is sent in step 502 to a predefined set of other firewalls.

The other firewalls to which the table is sent are typically firewalls of one organization, e.g. of one network operator administering the services offered to the customers by means of firewalls, which allow only the type of connections for the customers they have subscribed for.

Figure 6:
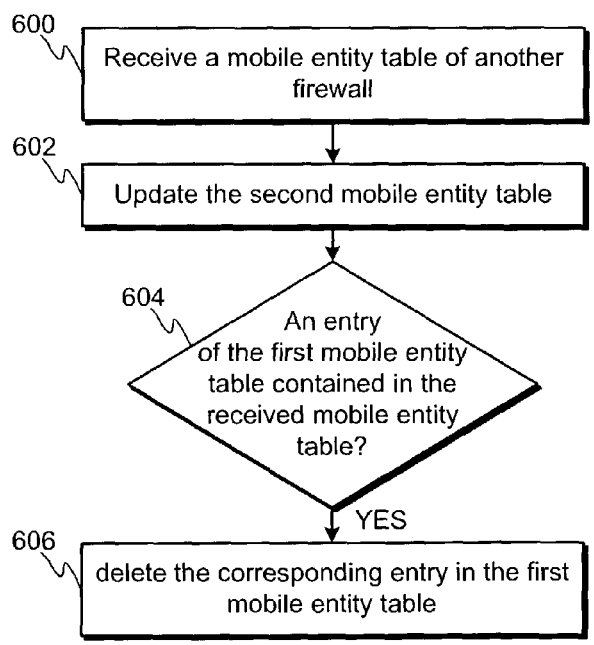
FIG. 6 is a flow diagram illustrating an exemplary method for handling a received mobile entity table.

FIG. 6 is a flow diagram illustrating an exemplary method for handling a received mobile entity table. In step 600, a firewall receives from at least one other firewall a mobile entity table comprising identifiers of mobile entities which are active in the at least one other firewall. In step 602, the second mobile entity table in the firewall is updated on the basis of the received mobile entity table. Updating involves deleting, adding and/or modifying entries. In step 604 it is checked if one of the entries in the firewall's first mobile entity table is included in the received mobile entity table. If that is the case, the corresponding entry is deleted in the firewall's first mobile entity table in step 606. If there are no entries of the first mobile entity in the received mobile entity table, only the second mobile entity table needs to be updated.

Receiving an entry of the first mobile entity table in a mobile entity table of some other firewall indicates that the corresponding entity has moved from the firewall to the other firewall and may therefore be deleted from the first mobile entity table of the firewall as unnecessary. The state information associated with the mobile entity are in practice queried from the firewall by the other firewall before deleting the corresponding entry in the first mobile entity table of the firewall. Alternatively, entries of a first mobile entity table may be removed also on the basis of a timer.

It must be appreciated that the embodiments described above are given as examples only, while the features described in one example may be combined with features of another example and various modifications can be made within the scope and spirit of the invention as defined in the appended claims.

The invention claimed is:

1. A method of handling mobile entities in a firewall, comprising
   maintaining a first mobile entity table comprising identifiers of mobile entities which are active in the firewall,
   maintaining a second mobile entity table comprising identifiers of mobile entities which are active in a predefined set of other firewalls and identifiers of corresponding other firewalls,
   detecting a new mobile entity, which is not currently active in the firewall,
   finding on the basis of the second mobile entity table, if the new mobile entity is currently active in another firewall, and
   if the mobile entity is currently active in another firewall, querying, from the another firewall, state information related to the new mobile entity, and storing the state information in the firewall to be used for processing data packets from/to the new mobile entity, and
   sending the first mobile entity table to a predefined set of other firewalls in response to an addition, deletion or modification of an entry in the mobile entity table.

2. A method according to claim 1, further comprising adding a new entry in the first mobile entity table after detecting a new mobile entity not currently active in the firewall, the new entry corresponding to the new mobile entity.

3. A method according to claim 1, further comprising sending the first mobile entity table to a predefined set of other firewalls as a response to an indication of a certain time period having elapsed since the first mobile entity table was sent the last time.

4. A method according to claim 1, further comprising sending the first mobile entity table to a predefined set of other firewalls as a response to receiving a request for the first mobile entity table.

5. A method according to claim 1, further comprising
   receiving from at least one other firewall a mobile entity table comprising identifiers of mobile entities which are active in the at least one other firewall,
   updating the second mobile entity table on the basis of the received mobile entity table, and
   deleting an entry in the first mobile entity table, if a corresponding entry is contained in the received mobile entity table.

6. A method according to claim 1, wherein detecting a new mobile entity comprises detecting a data packet in which the source is the new mobile entity.

7. A method according to claim 1, wherein detecting a new mobile entity comprises detecting a registration message from the new mobile entity.

8. A method according to claim 1, wherein the identifier is an IP address or a subscriber number.

9. A method according to claim 1, wherein the state information related to the new mobile entity comprises state of the ongoing connections of the new mobile entity.

10. A method of maintaining information in a firewall, comprising
    maintaining a first mobile entity table comprising identifiers of mobile entities which are active in the firewall,
    sending the first mobile entity table to a predefined set of other firewalls as a response to an addition, deletion or modification of an entry in the mobile entity table,
    receiving from at least one other firewall a mobile entity table comprising identifiers of mobile entities which are active in the at least one other firewall, and
    maintaining a second mobile entity table comprising identifiers of mobile entities which are active in the at least one other firewall and an identifier of the corresponding at least one other firewall on the basis of the mobile entity table received from said at least one other firewall.

11. A method according to claim 10, further comprising requesting from the at least one other firewall a mobile entity table comprising identifiers of mobile entities which are active in the at least one other firewall.

12. A method according to claim 10, further comprising sending the first mobile entity table to a predefined set of other firewalls as a response to an indication of certain time period having elapsed since the first mobile entity table was sent the last time.

13. A method according to claim 10, further comprising sending the first mobile entity table to a predefined set of other firewalls as a response to receiving a request for the first mobile entity table.

14. A firewall comprising
- memory and mechanism for maintaining a first mobile entity table comprising identifiers of mobile entities which are active in the firewall,
- memory and mechanism maintaining a second mobile entity table comprising identifiers of mobile entities which are active in a predefined set of other firewalls and identifiers of corresponding other firewalls,
- mechanism for detecting a new mobile entity, which is not currently active in the firewall,
- mechanism for finding on the basis of the second mobile entity table, if the new mobile entity is currently active in another firewall, and
- mechanism for querying, from the another firewall, state information related to the new mobile entity, and mechanism and memory for storing the state information in the firewall to be used for processing data packets from/to the new mobile entity, if the mobile entity is currently active in another firewall and
- mechanism for sending the first mobile entity table to a predefined set of other firewalls as a response to an addition, deletion or modification of an entry in the mobile entity table.

15. A firewall comprising
- memory and mechanism for maintaining a first mobile entity table comprising identifiers of mobile entities which are active in the firewall,
- mechanism for sending the first mobile entity table to a predefined set of other firewalls as a response to an addition, deletion or modification of an entry in the mobile entity table,
- mechanism for receiving from at least one other firewall a mobile entity table comprising identifiers of mobile entities which are active in the at least one other firewall, and
- memory and mechanism for maintaining a second mobile entity table comprising identifiers of mobile entities which are active in the at least one other firewall and an identifier of the corresponding at least one other firewall on the basis of the mobile entity table received from the at least one other firewall.

16. A non-transitory computer-readable medium, comprising computer software recorded thereon, which computer software, when executed in a computer device, causes the computer device to provide a firewall routine comprising
- maintaining a first mobile entity table comprising identifiers of mobile entities which are active in the firewall,
- maintaining a second mobile entity table comprising identifiers of mobile entities which are active in a predefined set of other firewalls and identifiers of corresponding other firewalls,
- detecting a new mobile entity, which is not currently active in the firewall,
- finding on the basis of the second mobile entity table, if the new mobile entity is currently active in another firewall,
- if the mobile entity is currently active in another firewall, querying, from the another firewall, state information related to the new mobile entity, and storing the state information in the firewall to be used for processing data packets from/to the new mobile entity, and
- sending the first mobile entity table to a predefined set of other firewalls as a response to an addition, deletion or modification of an entry in the mobile entity table.

17. A non-transitory computer-readable medium, comprising computer software recorded thereon, which, when executed in a computer device, causes the computer device to provide a firewall routine comprising
- maintaining a first mobile entity table comprising identifiers of mobile entities which are active in the firewall,
- sending the first mobile entity table to a predefined set of other firewalls as a response to an addition, deletion or modification of an entry in the mobile entity table,
- receiving from at least one other firewall a mobile entity table comprising identifiers of mobile entities which are active in the at least one other firewall, and
- maintaining a second mobile entity table comprising identifiers of mobile entities which are active in the at least one other firewall and an identifier of the corresponding at least one other firewall on the basis of the mobile entity table.

* * * * *